Sept. 8, 1964  G. A. MANSFIELD, JR  3,147,760
HYDRAULIC SPEED SENSE

Filed Jan. 30, 1961  2 Sheets-Sheet 1

INVENTOR.
GEORGE A. MANSFIELD JR
BY Whittemore
Hulbert & Belknap
ATTORNEYS

Sept. 8, 1964  G. A. MANSFIELD, JR  3,147,760
HYDRAULIC SPEED SENSE

Filed Jan. 30, 1961  2 Sheets-Sheet 2

*INVENTOR.*
GEORGE A. MANSFIELD JR.
BY
ATTORNEYS

United States Patent Office 3,147,760
Patented Sept. 8, 1964

3,147,760
HYDRAULIC SPEED SENSE
George A. Mansfield, Jr., Warren, Mich., assignor to Holley Carburetor Company, Warren, Mich., a corporation of Michigan
Filed Jan. 30, 1961, Ser. No. 85,584
8 Claims. (Cl. 137—56)

The invention relates to hydraulic speed senses and refers more specifically to improved means for controlling the flow of fluid through the speed sense whereby internal friction within the speed sense is substantially eliminated.

In the past hydraulic speed senses have been subject to inaccuracies due to internal friction therein. Such errors are extremely hard to compensate for since the determination of the exact amount of frictional resistance to movement within the speed sense is difficult to compute.

It is therefore a purpose of the present invention to provide an improved hydraulic speed sense wherein the means for metering fluid therethrough is substantially free from frictional forces.

Another object is to provide a hydraulic speed sense comprising a housing having a chamber formed therein, a hollow rotor rotatably mounted in the chamber, means for admitting fluid under pressure into the chamber, means for discharging fluid from the interior of the rotor, and substantially frictionless means for metering the fluid flow through the rotor.

Another object is to provide a hydraulic speed sense including a housing having a chamber therein, a hollow rotor rotatably mounted within the chamber, means for introducing fluid under pressure into the chamber, means for discharging fluid from the interior of the rotor, a metering assembly for metering the amount of fluid passing from the chamber into the rotor, balanced fly weights for controlling the metering means in accordance with the speed of rotation of the rotor and frictionless pivot support means for said fly weights.

Another object is to provide a hydraulic speed sense as set forth above wherein said balanced fly weights are spaced apart longitudinally of the axis of rotation of the rotor and are pivoted about an axis perpendicular to and generally intersecting the axis of rotation of the rotor.

Another object is to provide a hydraulic speed sense as set forth above wherein said metering means comprises an axial opening into the hollow rotor, a metering servo variably positioned over said opening, and a bearing cone secured to the fly weights operable to variably position said metering servo in accordance with the position of the fly weights.

Another object is to provide a hydraulic speed sense as set forth above wherein the frictionless pivot support means is held in assembly with the rotor by means of a locator at each end thereof seated in a recess in the rotor, and means for clamping the spring to the locators and securing the locators in assembly with the rotor.

Another object is to provide a hydraulic speed sense as set forth above which is simple in construction, economical to manufacture, and efficient in use.

Other objects and features of the invention will become apparent as the description proceeds, especially when taken in conjunction with the accompanying drawings, illustrating a preferred embodiment of the invention, wherein.

Figure 1:
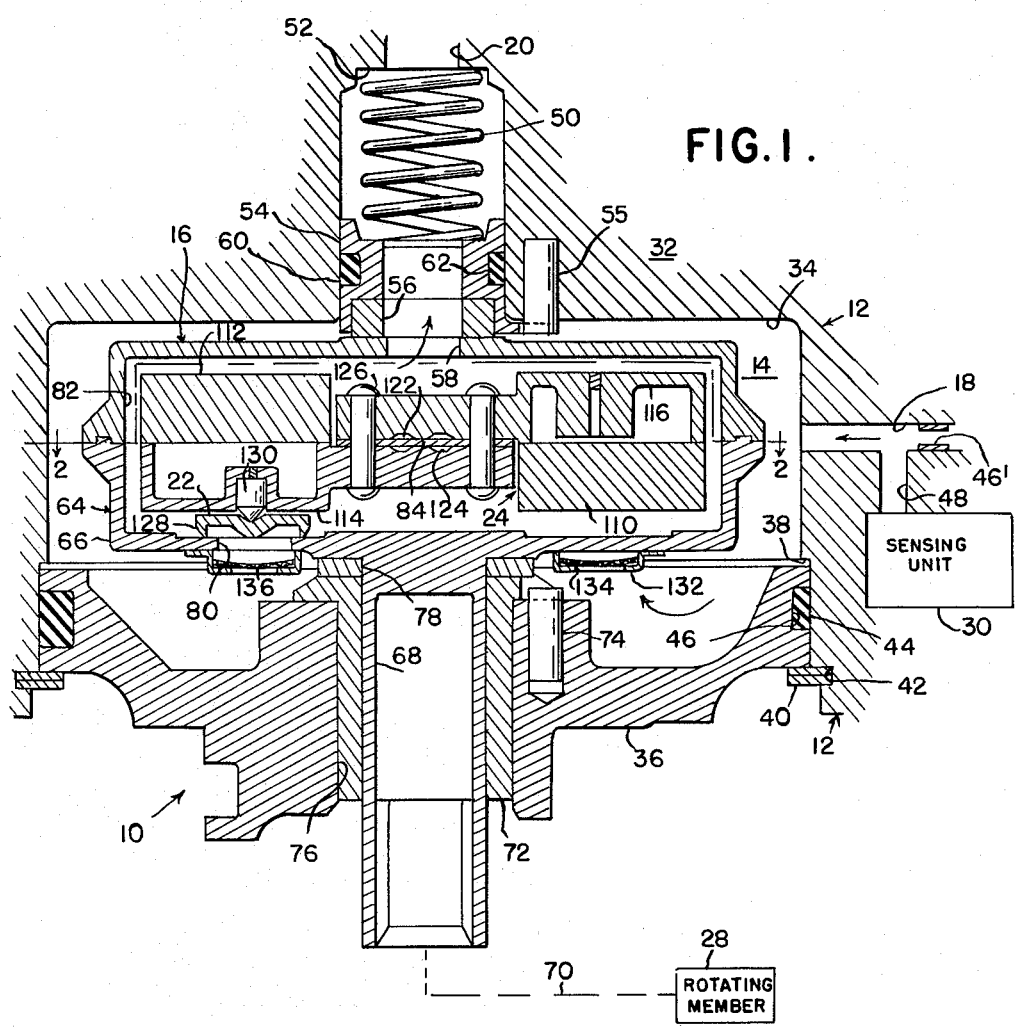
FIGURE 1 is a partly diagrammatic longitudinal section view of a hydraulic speed sense constructed according to the invention taken on line 1—1 in FIGURE 2.

With particular reference to the drawings a specific embodiment of the hydraulic speed sense of the invention will now be disclosed.

The hydraulic speed sense 10 comprises a housing 12 forming a chamber 14 in which a hollow rotor 16 is mounted for rotation. An inlet passage 18 is provided to introduce fluid under pressure into chamber 14. An outlet passage 20 is provided for discharging fluid from the interior of the rotor 16.

Metering means 22, the fly weight assembly 24 and the frictionless pivot mounting means 26 therefor are provided in accordance with the invention to meter the flow of fluid through the rotor in accordance with the speed of rotation of the rotor whereby the pressure within the chamber 14 is caused to vary with the speed of rotation of rotor 16.

Thus the speed of rotation of a member 28 connected to rotate rotor 16, as indicated in FIGURE 1, may be determined by proper calibration of a pressure responsive indicator 30 in accordance with the known operation of hydraulic speed senses.

More specifically the housing 12 comprises an inner housing member 32 having a recess 34 therein and an outer housing member 36. Outer housing member 36, shaped as shown best in FIGURE 1, is secured to the inner housing member 32 between the annular shoulder 38 in recess 34 and the locking ring 40 seated in annular groove 42 in recess 34. Sealing means 44 are positioned within annular recess 46 in outer housing member 36.

The inner housing member 32, as shown, is provided with inlet passage 18 extending therethrough through which fluid under pressure is delivered to chamber 14 through restriction 46'. Passage 48 which as indicated may be connected to passage 18 is provided in inner housing member 32 and is connected to a sensing unit 30 operable to indicate the speed of rotation of rotor 16 as indicated by the variation of pressure within chamber 14 as will be explained more fully subsequently. The sensing unit 30 forms no part of the present invention and since such sensing units are well known in the art, it will not be considered in detail herein.

An outlet passage 20 is also provided in inner housing member 32 to receive fluid discharged from the interior of rotor 16 as previously indicated. As shown best in FIGURE 1 a sealed connection is provided between the outlet passage 20 and the interior of the rotor 16 by means of spring 50 acting between the shoulder 52 formed in outlet passage 20 and bushing 54 which is inserted within the end of outlet passage 20 and held against rotation by means of pin 55. Seal 56 is thus pressed into engagement with rotor 16 around a discharge opening 58 therein as shown in FIGURE 1, so that rotor 16 is free to rotate and fluid therefrom may be discharged into outlet passage 20. Seal 60 is positioned in the cavity 62 in bushing 54 so that the fluid from chamber 14 is not permitted to pass directly through the chamber 14 to the outlet passage 20 without first passing through the rotor 16.

Rotor 16 comprises a lower portion 64 including a cylindrical part 66 rigidly secured to a shaft 68 for rotation therewith. Shaft 68 is connected as indicated at 70 to the means 28, the speed of rotation of which is to be sensed as by a pressure signal, by sensing unit 30.

Shaft 68 is mounted for rotation in bushing 72 which is secured against rotation by means of pin 74 within opening 76 through the outer housing member 36. Bearing 78 is provided between bushing 72 and the cylindrical part 66 of the portion 64 of rotor 16.

An axial opening 80 is provided in the cylindrical part 66 of portion 64 of rotor 16. Thus fluid under pressure within chamber 14 is permitted to enter chamber 82 within rotor 16 through opening 80 and subsequently to pass through opening 58 in rotor 16 and into the outlet passage 20.

The fluid pressure in chamber 14 depends upon the quantity of fluid permitted to pass through opening 80. The quantity of fluid permitted to pass through opening 80 is controlled by the metering means 22, the fly weight assembly 24 and the frictionless pivot means 26.

Figure 4:
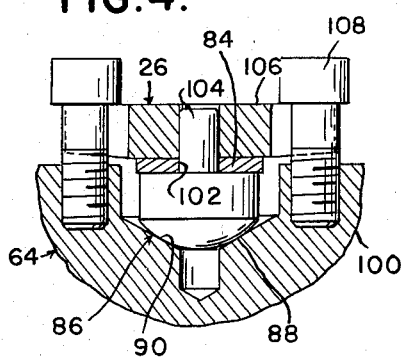
FIGURE 4 is an enlarged partial section of the hydraulic speed sense of the invention taken on the line 4—4 in FIGURE 2.
Figure 3:
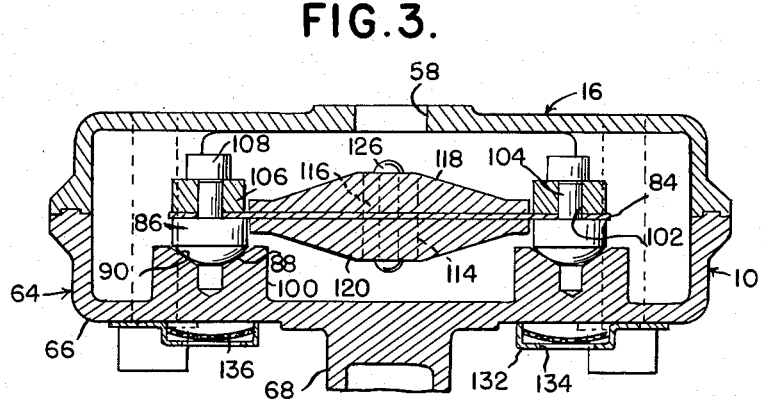
FIGURE 3 is a partial longitudinal section of the hydraulic speed sense shown in FIGURE 1 taken on the line 3—3 in FIGURE 2.

As shown best in FIGURES 3 and 4 the frictionless pivot mounting means 26 comprises a spring 84 rigidly secured at both ends to the rotor 16. The spring 84 is positioned accurately with respect to the rotor 16 by locators 86 having a spherical lower portion 88, as shown, adapted to be seated in accurately positioned locator seats 90 on bosses 100 integral with the portion 64 of the rotor 16. The spring is provided with openings 102 in the ends thereof adapted to fit over the stud 104 of the locators 86. The locators 86 and spring 84 are clamped in position by means of the clamp 106 and screws 108 as shown best in FIGURE 4.

Figure 2:
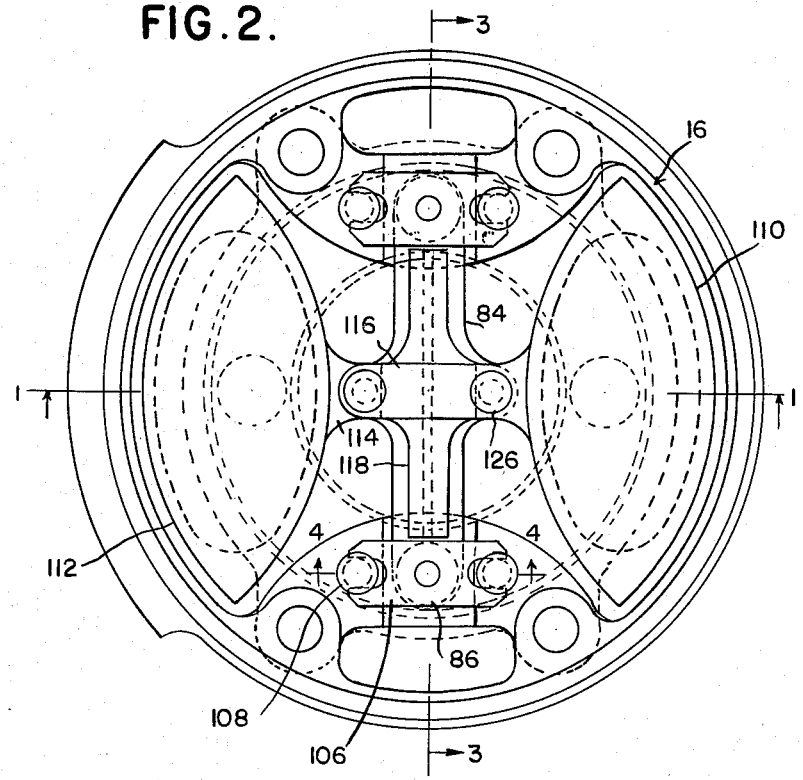
FIGURE 2 is a cross section view of the hydraulic speed sense shown in FIGURE 1 taken on line 2—2 in FIGURE 1.

The fly weight assembly 24 is secured to the spring 84 centrally thereof as shown best in FIGURE 1. Fly weight assembly 24 comprises a pair of balanced fly weights 110 and 112 secured to fly weight arms 116 and 114 respectively by means of brazing or the like. The fly weight arms 114 and 116 as shown best in FIGURE 2 are provided with transversely extending cross bar portions 120 and 118 respectively, which contact the spring 84 substantially centrally thereof on the longitudinal axis of the spring. The fly weight arms 114 and 116 are further provided with recesses 124 and 122 respectively to prevent binding of the edges of the spring thereby. The fly weight arms 114 and 116 are clamped to the spring 84 by means of rivets 126 as shown.

Thus the fly weights 110 and 112 are pivotally supported by the frictionless pivot means 26 and are spaced apart longitudinally of the axis of rotation of the rotor 16. The pivotal centerline or axis of the speed responsive fly weights 110 and 112 is within the spring 84 and thus is perpendicular to and generally intersecting the axis of rotation of rotor 16 and shaft 68. Thus on rotation of the shaft 68 the fly weights 110 and 112 will be caused to rotate about an axis perpendicular to the axis of rotation of the shaft 68 an amount dependent upon the speed of rotation of the shaft.

The fuel metering assembly 22 comprises the metering servo 128 positioned over the opening 80 as shown best in FIGURE 1 and the bearing cone 130 rigidly secured to the fly weight arm 114 as shown in FIGURE 1. The position of the metering servo 128 depends on the amount of rotation of fly weights 110 and 112 about the axis thereof perpendicular to and intersecting the axis of rotation of shaft 68 on rotation of the shaft 68 and rotor 16.

Ideally the pressure differential across the valve element 128 is the force that totally balances the centrifugal force generated by the fly weights 110 and 112. Thus the spring 84 is not an essential element in the practice of the invention. A more desirable construction would be pivot mounting means for the fly weights 110 and 112 having neither friction nor spring force. Since such construction is not practical however the spring 84 contributing as little spring force as possible to the balance between the pressure differential across valve element 128 and the centrifugal force generated by the fly weights 110 and 112 which force may be calculated with exactness is provided to pivotally mount fly weights 110 and 112.

An annular retainer 132 having openings 134 spaced angularly thereabout is secured to the cylindrical portion 66 of the lower part 64 of rotor 16 as shown. The retainer 132 supports the straining screen 136 therein. Thus fluid passing from chamber 14 into chamber 82 must pass through opening 134 where it is strained through screen 136 and subsequently passed through opening 80.

In operation fluid under pressure is passed through restriction 46' in inlet passage 18 into chamber 14. Initially the metering servo 128 is closed as shown in FIGURE 1, however subsequently the fluid under pressure in chamber 14 rotates the flyweight assembly 24 clockwise as shown in FIGURE 1 to unseat the servo 128 and the fluid passes through opening 80 into chamber 82 and is discharged from chamber 82 into the outlet passage 20 through opening 58.

The passage of the fluid through the speed sense is controlled in accordance with the speed of rotation of the rotor 16 by means of the metering servo 128. The rotor 16 is caused to rotate at a speed proportional to the speed of the device 28 whose rotational speed it is desired to sense by sensing unit 30.

On rotation of the rotor the fly weights 110 and 112 secured to frictionless pivot mounting means 26 as disclosed above are caused to rotate counterclockwise as shown in FIGURE 1 about an axis perpendicular to the axis of rotation of the rotor 16 due to the longitudinally spaced apart center of gravities thereof with respect to the axis of the rotor. The amount of counterclockwise angular displacement of the fly weight assembly 24 as shown in FIGURE 1 is dependent upon the speed of rotation of the rotor 16 and controls the position of the metering servo 128 by means of bearing cone 130 secured to the fly weight arm 114 in conjunction with the pressure of fluid in chamber 14. Thus the faster the rotor is rotated the more nearly the metering servo 128 will close the opening 80.

Since the position of the metering servo 128 determines the quantity of fluid which passes through the rotor 16 and therefore the variation of pressure within chamber 14, it can therefore be seen that with the device disclosed the sensing unit 30 connected to passage 48 will provide an indication which will be proportional to the speed of rotation of the member 28.

Further it will be obvious that since the fly weight arms are supported on the spring 84 which is rigidly secured to the rotor 16 at the ends thereof and since only a point contact is necessary between the bearing cone 130 and the metering servo 128 that internal friction within the speed sense disclosed is substantially eliminated. The point contact between the bearing core 130 and metering servo 128 is always maintained due to the normally closed position of the counterweight assembly as shown in FIGURE 1 and the balance between fluid pressure in chamber 14 and the force acting on the flyweight assembly 24 including the force of spring 82 and centrifugal force.

The drawings and the foregoing specification constitute a description of the improved hydraulic speed sense in such full, clear, concise and exact terms as to enable any person skilled in the art to practice the invention, the scope of which is indicated by the appended claims.

What I claim as my invention is:

1. A hydraulic speed sense comprising a housing, a chamber within said housing, a hollow rotor mounted in said housing for rotation within said chamber, means for passing fluid under pressure into said chamber, means for withdrawing fluid from the interior of said rotor, an axial opening in said rotor, a servo valve adjustably positionable with respect to said opening to control the entry of fluid from said chamber into the interior of said rotor, pivot means, a pair of locators seated within said rotor adapted to receive said pivot means, and clamping means to clamp the pivot means to the locators and fix the position of the locators within the rotor, and a pair of fly weights spaced apart axially of said rotor mounted on said pivot means for rotation only about the axis of the rotor and a fixed single axis perpendicular thereto engageable with said servo valve for adjustably positioning the servo valve in accordance with the speed of rotation of said rotor.

2. Structure as claimed in claim 1 wherein said pivot means is an elongated flat spring.

3. A hydraulic speed sense comprising a housing, a chamber within said housing, a hollow rotor mounted in said housing for rotation within said chamber, means for passing fluid under pressure into said chamber, means for withdrawing fluid from the interior of said rotor, an axially extending opening in said rotor parallel to and offset from the axis of rotation of the rotor, a servo valve adjustably positioned with respect to said opening to control the entry of fluid from said chamber into the interior of said rotor, pivot means, a pair of locators seated within said rotor adapted to receive said pivot means and clamping means to clamp the pivot means to the locators and fix the position of the locators within the rotor, and a pair of flyweights spaced apart axially of said rotor mounted on said pivot means on opposite sides of the axis of said rotor for rotation about both the axis of the rotor and a single axis perpendicular to and intersecting the axis of rotation of the rotor one of which is engageable with said servo valve for adjusting the position of the servo valve axially of the axis of rotation of the rotor in accordance with the speed of rotation of said rotor.

4. A hydraulic speed sense comprising a housing, a chamber within said housing, a hollow rotor mounted in said housing for rotation within said chamber, means for passing fluid under pressure into said chamber, means for withdrawing fluid from the interior of said rotor, an axially extending opening in said rotor offset transversely from the axis of rotation of said rotor, a servo valve adjustably positionable with respect to said opening to control the entry of fluid from said chamber into the interior of said rotor, pivot means secured within said rotor, and a pair of flyweights having their center of gravity spaced apart axially of the axis of rotation of said rotor mounted on said pivot means for rotation about only the axis of rotation of the rotor and a fixed, single axis perpendicular to and intersecting the axis of rotation of the rotor one of which is engageable with said servo valve for adjustably positioning the servo valve in accordance with the speed of rotation of said rotor.

5. The structure as claimed in claim 4 wherein the pivot means is an elongated flat spring and further including means for holding both the ends of the flat spring in a fixed position within the rotor.

6. A hydraulic speed sense comprising a housing, a chamber within said housing, a hollow rotor mounted in said housing for rotation within said chamber, means for passing fluid under pressure into said chamber, means for withdrawing fluid from the interior of said rotor, an axial opening in said rotor, a servo valve adjustably positionable with respect to said opening to control the entry of fluid from said chamber into the interior of said rotor, pivot means, a pair of spaced apart conical seats within said rotor, a pair of locators having spherical seating surfaces seated within the conical seats in said rotor adapted to receive said pivot means and clamping means to clamp the pivot means to the locators and fix the locators in the conical seats, and a pair of flyweights spaced apart axially of said rotor mounted on said pivot means for rotation about both the axis of the rotor and an axis perpendicular thereto engageable with said servo valve for adjustably positioning the servo valve in accordance with the speed of rotation of said rotor.

7. A hydraulic speed sense comprising a housing, a chamber within said housing, a hollow rotor mounted in said housing for rotation within said chamber, means for passing fluid under pressure into said chamber, means for withdrawing fluid from the interior of said rotor, an axially extending opening in said rotor parallel to and offset from the axis of rotation of the rotor, a servo valve adjustably positioned with respect to said opening to control the entry of fluid from said chamber into the interior of said rotor, pivot means, a pair of locators seated within said rotor adapted to receive said pivot means and clamping means to clamp the pivot means to the locators and fix the position of the locators within the rotor, a pair of flyweights spaced apart axially of said rotor mounted on said pivot means on opposite sides of the axis of said rotor for rotation about both the axis of the rotor and an axis perpendicular thereto one of which is engageable with said servo valve for adjusting the position of the servo valve axially of the axis of rotation of the rotor in accordance with the speed of rotation of said rotor, a centrifugally balanced annular retainer having a U-shaped cross section and a plurality of angularly spaced apart openings therethrough, said retainer being secured to the rotor and extending over the opening in the rotor and filter means secured within the retainer for filtering fluid drawn from the chamber into the rotor through the openings in the retainer and the opening in the rotor.

8. A hydraulic speed sense comprising a housing, a chamber within said housing, a hollow rotor mounted in said housing for rotation within said chamber, means for passing fluid under pressure into said chamber, means for withdrawing fluid from the interior of said rotor, an axial opening in said rotor, a servo valve adjustably positionable with respect to said opening to control the entry of fluid from said chamber into the interior of said rotor, pivot means, a pair of spaced apart conical seats provided in said rotor, a pair of locators having spherical surfaces positioned on said conical seats within said rotor adapted to receive said pivot means, clamping means for clamping the pivot means to the locators and securing the locators within the spherical seating surfaces in a fixed position, and flyweight structure mounted on said pivot means engageable with said servo valve for adjustably positioning the servo valve in accordance with the speed of rotation of said rotor.

References Cited in the file of this patent

UNITED STATES PATENTS

| 2,238,380 | Alman | Apr. 15, 1941 |
| 2,467,445 | Schwendner | Apr. 19, 1949 |
| 2,840,094 | Taplin | June 24, 1958 |
| 2,858,839 | Jackson | Nov. 4, 1958 |

FOREIGN PATENTS

| 806,011 | Great Britain | Dec. 17, 1958 |
| 815,584 | Great Britain | July 1, 1959 |